C. B. SIMMONS.
FLOOR AND CEILING PLATE AND PROCESS OF MAKING THE SAME.
APPLICATION FILED APR. 15, 1909.
930,624.
Patented Aug. 10, 1909.
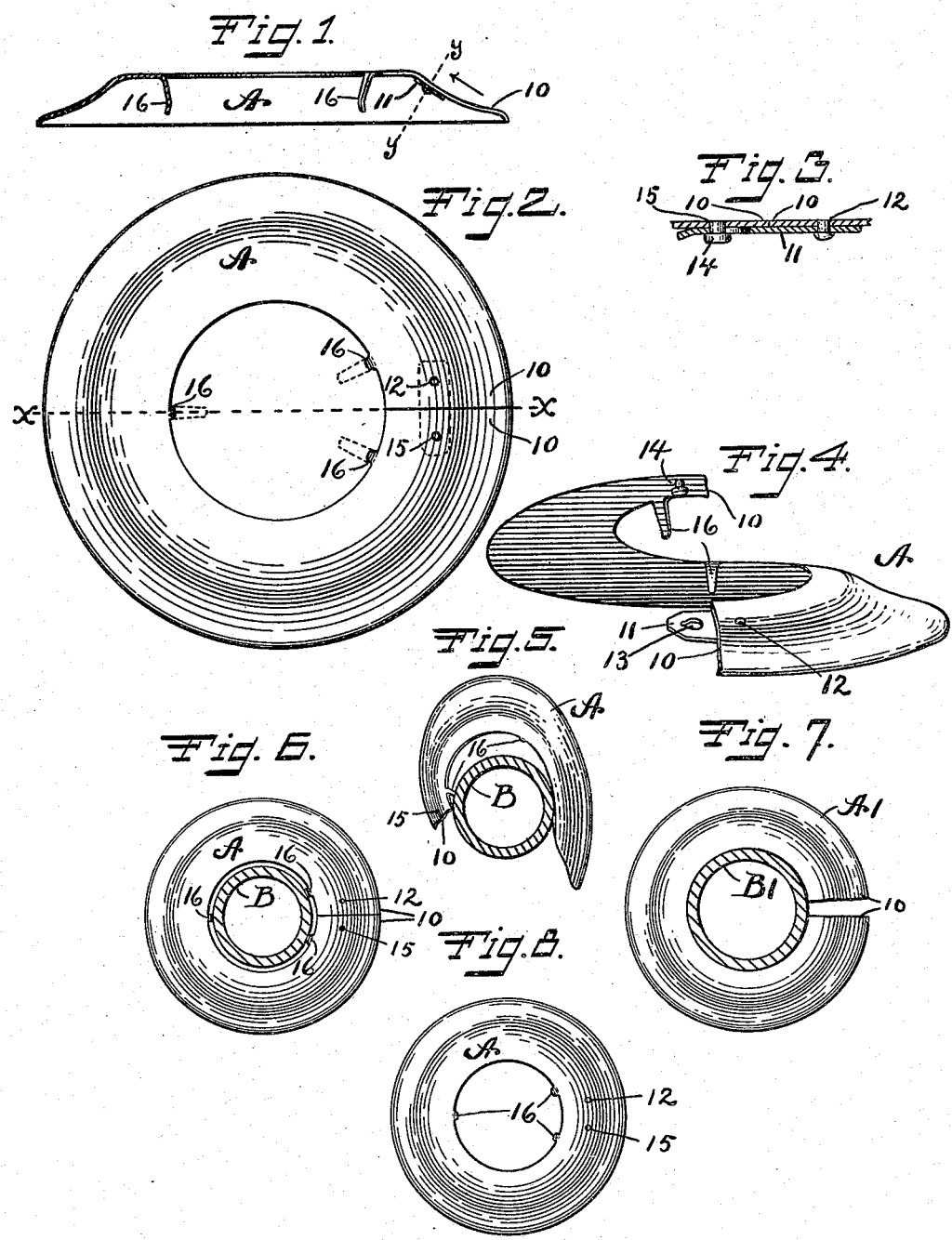

UNITED STATES PATENT OFFICE.

CHARLES B. SIMMONS, OF BRISTOL, CONNECTICUT.

FLOOR AND CEILING PLATE AND PROCESS OF MAKING THE SAME.

No. 930,624.      Specification of Letters Patent.      Patented Aug. 10, 1909.

Application filed April 15, 1909. Serial No. 490,057.

*To all whom it may concern:*

Be it known that I, CHARLES B. SIMMONS, a citizen of the United States, residing at Bristol, in the county of Hartford and State of Connecticut, have invented certain new and useful Improvements in Floor and Ceiling Plates and Processes of Making the Same, of which the following is a specification.

My invention relates to improvements in floor and ceiling plates and the process of making the same, and the objects of my improvements are simplicity and economy in construction and convenience and efficiency in use.

In the accompanying drawing: Figure 1 is a sectional view of my floor and ceiling plate on the line $x\,x$ of Fig. 2. Fig. 2 is a plan view of the same. Fig. 3 is a sectional view on an enlarged scale of a portion of my plate, on the line $y\,y$ of Fig. 1. Fig. 4 is a side view of my plate on the same scale as Figs. 1 and 2, opened out somewhat as for slipping onto a pipe. Fig. 5 shows on a reduced scale a plan view of a plate and section of a pipe, the pipe being between the opened out ends of the plate. Fig. 6 shows a plan view of my floor and ceiling plate together with a horizontal section of a pipe. Fig. 7 shows a similar view of a modification. Fig. 8 shows a punched and shaped blank previous to slitting across one side.

A is the body of my improved floor and ceiling plate and is made of tempered spring sheet steel, circular in form and generally flat though preferably somewhat dished upward from the periphery inward toward the center in accordance with pleasing curves for artistic effect. The said body A is provided with a radial slit on one side, separating the body ends 10. The normal tendency of the said body A because of the material of which it is composed and the process followed in the manufacture, to be hereinafter described, is to bring the said body ends 10 into abutment, essentially in the relative position as before the said ends 10 were separated by the said slit. For reasons to be hereinafter stated in special cases it may be desirable to provide a latch to be hereinafter described, bridging the said slit and connecting by a positive lock the said body ends 10.

The body A as described constitutes a split ring, the ends of which may be sprung apart for receiving the pipe B within the central opening of the said body or for removing the said body A from a pipe. After the said pipe B has been received within the said central opening and after the said body A has been removed from said pipe B the normal tendency of the said body A is to bring the said body ends 10 into abutment, as has been described. Integral with the inner periphery of the said body A there may be provided spring prongs 16 suitable for bearing against the outside of a pipe B when the body A is in position around the said pipe B, the said spring prongs 16 tending to centralize the said body A with reference to the said pipe B in case the said pipe B happens to be of smaller diameter than the central opening in the said body A, and of more importance is the function of supporting the plate itself in position in case the same is used as a ceiling plate. The said prongs 16 are accordingly an indispensable feature of my plate when used as a ceiling plate, but may be dispensed with when used as a floor plate. Being formed integral with the said body A the said prongs 16 are also of tempered spring steel and are on this account well adapted to bring suitable pressure to bear against the side of the pipe B for the said purpose of support.

I prefer to provide three of said prongs 16, one diametrically opposite the said slit, and the other two one on each side and close to said slit, being made integral with the said abutting body ends 10, the location being preferred for the purpose of avoiding any obstruction on the part of the prongs to the slipping of the said body A on and off a pipe B, and at the same time generally balancing the effect of the lateral pressure of the said prongs 16 so as to tend to retain the said body A in a plane normally at right angles to the said pipe B. Because of the lateral pressure of the said spring prongs 16 when such prongs are used the effect of the same is to oppose the normal tendency of the said body A to bring the said body ends 10 into abutment in the manner described. In such case it is desirable to provide a positive lock for bridging said slit and connecting the said body ends 10. Such a lock may be provided comprising a latch composed of the eye member 11 mounted on one of the said body ends 10 by means of a rivet passing through a hole 12 in one of the said body ends 10 and a headed pin member 14 mounted in the other of the said body ends 10 by means of its upper end passing through the hole 15 in the said body end 10, the said eye member 11 having an eye 13 adapted to engage with the said headed pin member 14 between the head of the same and the face of the said body end 10.

The plate shown in Fig. 4 has a body A provided with spring prongs 16 and the latch having the eye member 12 and the pin member 14 complete and is accordingly adapted for use as a ceiling plate.

In Fig. 7 is shown a modification in which the body $A^1$, without any prongs 16 or latch members, is mounted on the pipe $B^1$ somewhat large for the central opening so that the said ends 10 cannot be brought into abutment, being separated by an appreciable space. The resiliency of the material of the said body $A^1$ serves to retain the said body $A^1$ in position around the said pipe $B^1$.

The modified plate shown in Fig. 7 without the latch and without the prongs, is a form adapted for use as a floor plate, a service for which special means of support is not required.

The floor and ceiling plate described is adapted to retain itself normally in position in the manner described and at the same time is readily removed from or replaced in position on the pipe at will without injury or undue straining of the material by the simple expedient of spreading the said body ends 10, and slipping the said body A on or off as desired. With the prongs located in the positions specifically mentioned, there is no obstruction on their part to the slipping on or off of the said body A as described, and with the latch provided for retaining the body ends 10 in abutment the plate is self sustaining on account of the lateral pressure of the said prongs.

The first step in the process followed in producing my improved floor and ceiling plate is to punch out the blank flat of untempered and unhardened spring sheet steel in the form of a wide ring, having the said integral prongs 16 extending radially inwardly from the periphery of the central opening, and at the same time punch the two holes respectively for the holes 12 and 15, one for the rivet which holds the said eye member 11 and the other for the headed pin member 14 of the said latch. The next step is to dish or shape the said punched blank to whatever special formation is desired and to bend downward the said prongs 16, as shown in Fig. 8. The next step is the hardening process by which the blank, punched and shaped as described, is hardened, the same still retaining the form shown in Fig. 8. The next step is tempering the hardened blank to a spring temper after any ordinary method of tempering springs, the blank still retaining the form shown in Fig. 8. The next step is slitting the tempered blank across the said body A, thus separating the ring and forming the ends 10. This may be done by a shearing process with a suitable die and punch. Then the elements of the latch may be placed in position as desired.

An important feature of the process is the completion of the punching, shaping and bending, and hardening and tempering stages of the process before slitting the body A, in consequence of which the normal tendency of the said body A is to bring the said ends 10 into abutment, opposing on account of the resiliency of the material of which it is composed any tendency of either opening apart or overlapping laterally or passing one above the other.

I claim as my invention:

1. A floor and ceiling plate laterally removable from and replaceable on a pipe, said plate comprising a flat split ring of tempered spring steel normally closed by the resiliency of the said tempered spring steel.

2. A floor and ceiling plate laterally removable from and replaceable on a pipe, said plate comprising an essentially flat ring of tempered spring steel having a radial slit through one side, said slit normally closed by the resiliency of the said tempered spring steel.

3. A floor and ceiling plate having a body and prongs of tempered spring steel, said body comprising a split ring having a central opening for receiving a pipe, said prongs mounted on the inner periphery of said central opening and adapted to bear against the said pipe and thereby support the said plate.

4. A floor and ceiling plate having a body and prongs of tempered spring steel, said body and said prongs integral, said body having a radial slit through one side and a central opening for receiving a pipe, said prongs extending from the inner periphery of said central opening.

5. A floor and ceiling plate comprising a body, prongs, and a latch, said body provided with a radial slit and a central opening for receiving a pipe, said prongs extending inwardly from said central opening and adapted to bear laterally against said pipe and to support said plate, said body and said prongs integral and composed of resilient material, said latch bridging said radial slit and positively locking the opposed ends of said body against the lateral pressure of said prongs.

6. The process of making floor and ceiling plates of tempered spring steel consisting of stamping out an annular plate from a blank, shaping, hardening, tempering, and slitting the tempered annular plate so formed through one side.

7. The process of producing a floor and ceiling plate having a body and integral supporting prongs consisting of stamping out an annular plate having integral prongs extending inward radially from the central opening, shaping the said body and prongs, hardening and tempering said body and prongs, and providing a slit radially through one side of said body.

8. The process of making sheet metal floor and ceiling plates which consists of first blanking out a ring and shaping it to the desired form, then hardening and tempering the same to a spring temper when the ring is intact, and after tempering severing the ring at one side by slitting.

CHARLES B. SIMMONS.

Witnesses:
ERNEST R. BURWELL,
WILLIAM L. NEUBAUER.